United States Patent [19]

Okamoto et al.

[11] Patent Number: 4,770,832
[45] Date of Patent: Sep. 13, 1988

[54] PROCESS FOR MANUFACTURING OF STRUCTURAL REINFORCING MATERIAL

[75] Inventors: Tadashi Okamoto, Fujisawa; Sumiyuki Matsubara, Matsudo; Koichi Hasuo, Tokyo; Masahisa Handa, Tama, all of Japan

[73] Assignee: Mitsui Kensetsu Kabushiki Kaisha, Tokyo, Japan

[21] Appl. No.: 758,721

[22] Filed: Jul. 25, 1985

[30] Foreign Application Priority Data

Jul. 27, 1984 [JP] Japan .................. 59-155489
Jul. 27, 1984 [JP] Japan .................. 59-155490
Jul. 27, 1984 [JP] Japan .................. 59-155491
Aug. 16, 1984 [JP] Japan .................. 59-170024

[51] Int. Cl.$^4$ ............................................. B29C 59/02
[52] U.S. Cl. .................. 264/103; 264/136; 264/137; 264/284; 264/289.3; 264/292; 264/293
[58] Field of Search ............. 264/137, 164, 231, 292, 264/293, 284, 289.3, 103, 136

[56] References Cited

U.S. PATENT DOCUMENTS

| | | | |
|---|---|---|---|
| 1,128,480 | 2/1915 | Miller | 264/293 |
| 2,571,717 | 10/1951 | Howald et al. | |
| 2,694,661 | 11/1954 | Meyer | |
| 2,749,266 | 6/1956 | Eldred | 264/137 |
| 3,244,784 | 4/1966 | Boggs | 264/137 |
| 3,960,473 | 6/1976 | Harris | |
| 4,194,873 | 3/1980 | Killmeyer | |
| 4,244,765 | 1/1981 | Tokuno | 264/137 |
| 4,515,737 | 5/1985 | Karino et al. | 264/137 |

FOREIGN PATENT DOCUMENTS

| | | | |
|---|---|---|---|
| 0705294 | 3/1965 | Canada | 264/137 |
| 0063515 | 10/1982 | European Pat. Off. | |
| 2756917 | 7/1978 | Fed. Rep. of Germany | 264/137 |
| 45-23431 | 8/1970 | Japan | 264/137 |
| 51-6071 | 2/1976 | Japan | 264/137 |
| 54-148087 | 11/1979 | Japan | 264/137 |
| 55-55828 | 4/1980 | Japan | 264/284 |
| 55-61430 | 5/1980 | Japan | 264/293 |
| 58-170963 | 10/1983 | Japan | 264/137 |
| 1554011 | 7/1984 | Japan | |
| 60-187534 | 9/1985 | Japan | |
| 0052254 | 1/1967 | Poland | 264/137 |
| 1543586 | 4/1979 | United Kingdom | |
| 0937207 | 6/1982 | U.S.S.R. | 264/137 |

*Primary Examiner*—Jan H. Silbaugh
*Assistant Examiner*—Hubert C. Lorin
*Attorney, Agent, or Firm*—Birch, Stewart, Kolasch & Birch

[57] ABSTRACT

A process relating to the manufacturing of a structural reinforcing material which is made of a glass fiber reinforced plastic, a carbon fiber reinforced plastic or similar material wherein a precise sectional shape is not required. A fiber body including a plurality of reinforcing fibers is impregnated with a hardenable material and subsequently introduced into a drawing die having a desired sectional shape so as to be formed into a drawn article having a predetermined sectional shape. A tape is coiled therearound so as to cover the article. A string member is coiled therearound to thrust into the surface of the article. Thereafter, the drawn fiber body is subjected to a hardening treatment and the tape and string member are removed.

5 Claims, 4 Drawing Sheets

FIG. 7
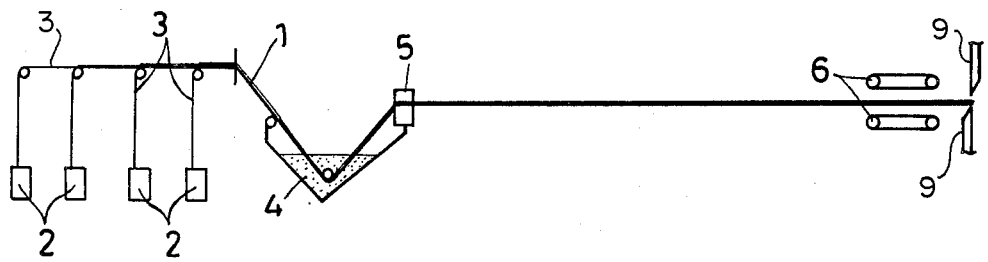
FIG. 8
FIG. 9
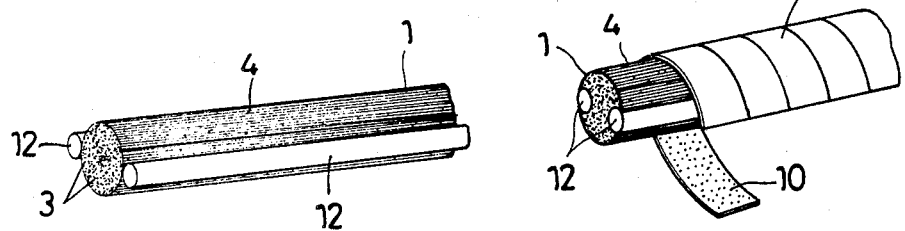
FIG. 10
FIG. 11
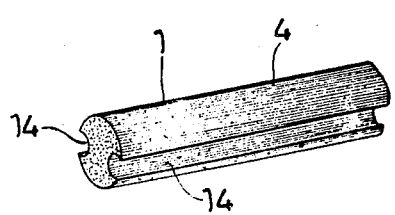
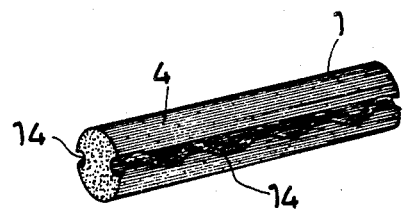

PROCESS FOR MANUFACTURING OF STRUCTURAL REINFORCING MATERIAL

BACKGROUND OF THE INVENTION

1. Field of the Invention

This invention relates to a process for manufacturing a structural reinforcing material which is made of a glass fiber reinforced plastic, a carbon fiber reinforced plastic or similar material wherein a precise sectional shape is not required. The structural reinforcing material is used, for instance, as a main reinforcing bar for concrete, a reinforcing bar for shear resistance or the like. The invention also relates to the product per se.

2. Description of Background Art

Hitherto a process was available for manufacturing a structural reinforcing material wherein a fiber body comprising a number of threads made of reinforcing fiber was impregnated with a hardenable material such as a thermosetting resin or the like. This material is then introduced into a drawing die so as to be formed into a drawn article having a predetermined sectional shape. The drawn fiber body is subjected to a hardening treatment in a hardening metallic mold.

The foregoing conventional process is inconvenient in that at each time when any varied sectional shape of a structural reinforcing material is desired to be manufactured a different type of metallic mold of which the sectional shape corresponds to the sectional shape of the varied die is required. Consequently, the work for exchanging an old mold to a new one is troublesome and the manufacturing cost is increased.

SUMMARY AND OBJECTS OF THE PRESENT INVENTION

A purpose of this invention is to remove the foregoing inconveniences and provide a process for manufacturing a structural reinforcing material which does not require the conventional hardening metallic mold.

Another object of the present invention is to improve productivity.

The present invention provides a fiber body comprising plural threads made of reinforcing fiber which are impregnated with a hardenable material and subsequently introduced into a drawing die having a desired sectional shape so as to be formed into a drawn article having a predetermined sectional shape. A tape is coiled therearound so as to cover the article. Thereafter, the drawn fiber body is subjected to a hardening treatment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a diagram showing a modified example of the present invention;

FIG. 8 is a perspective view of a step for positioning shaping members on a drawn fiber body, in the example shown in FIG. 7;

FIG. 9 is a perspective view of a step for coiling a tape around the fiber body bearing the shaping members in the example;

FIG. 10 is a perspective view of part of a structural reinforcing material produced by the present invention;

FIG. 11 is a perspective view of part of another product according to a modified example;

FIG. 12 is a side view of a step for applying projection forming members to a drawn fiber body and FIG. 13 is a side view of part of a step for coiling a string member around the fiber body assembled with the projection forming members;

DETAILED DESCRIPTION OF THE PREFERRED EMBODIMENTS

Figure 1:
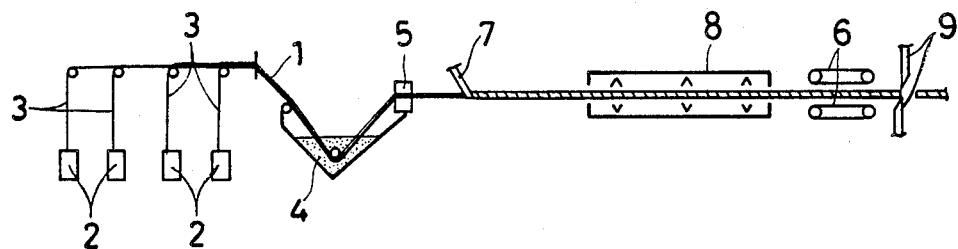
FIG. 1 is a diagram showing one embodying example of a process for manufacturing of a structural reinforcing material according to the present invention.
Figure 2:
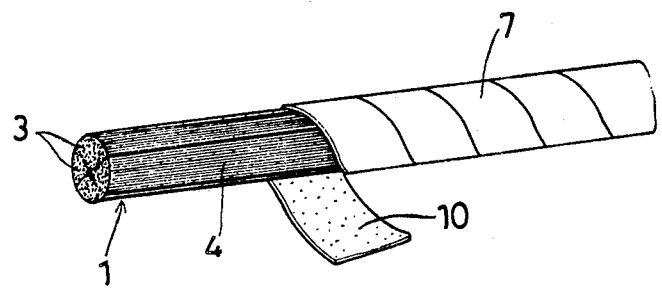
FIG. 2 is an enlarged perspective view showing a step for coiling a tape around a drawn fiber body for covering the same in the embodying example shown in FIG. 1.

FIG. 1 and FIG. 2 show one example of a process for manufacturing a structural reinforcing material according to the present invention. A fiber body 1 is formed from a plurality of threads 3 supplied from the supply source 2. The threads 3 comprise roving, for instance, and are made of any kind of fiber selected from any inorganic fiber such as carbon fiber, glass fiber, ceramic fiber, etc., any heat resisting organic fiber of aromatic polyamide, aromatic polyether amide, aromatic polysulfonamide, aromatic polyketone amide, aromatic polyamine amide, etc., and any metallic fiber of stainless, etc. The threads 3 may be not only any type of yarn selected from the roving, multifilaments, strand, sliver, but also monofilament.

In the illustrated example, the thread comprises roving as mentioned above, and those threads 3 are collected into a parallel arrangement one with or without twist to form a fiber body 1. The fiber body 1 is impregnated with a hardenable material 4 contained in a soaking container.

The hardenable material 4 may be any cold or heat setting resin such as an epoxy series, vinyl ester series, phenol series, polymide, etc., any cold or heat setting inorganic material such as an alkali metallic silicate series, colloidal silica series, phosphate series, cement series, etc., or a mixture of the foregoing organic and inorganic cold or heat setting materials. In the hardenable material, there may be added a hardening agent, a coloring agent, or others as occasion demands.

The fiber body 1 after being impregnated with the hardenable material 4 is introduced into a drawing die 5 having a desired sectional shape such as a circle or the like so as to be formed into a drawn article having a predetermined sectional shape according to the die. Referring to FIG. 1, a drawing means 6 is provided for drawing the fiber body 1 from the die 5.

The above steps are not different from those of the conventional process. Next, according to the present invention, a tape 7 is coiled around the fiber body 1 drawn from the die 5 by a wrapping apparatus (not shown), for instance, so as to cover the same. Thereafter, the drawn fiber body 1 covered with the coiled tape 7 is moved into a heating chamber 8 in a case where a thermosetting resin is used as the hardenable material 4 in order to be subjected to a hardening treatment. After the drawn fiber body 1 becomes completely rigid, the same is taken out from the heating chamber 8, and is then cut by a cutter 9 into pieces of a predetermined length, and the tape is removed from each thereof, to obtain a large number of structural reinforcing materials.

As occasion demands, the hardening treatment may be divided into two stages. In this case, in the foregoing example, an additional heating chamber (not shown) is provided before or after the heating chamber 8.

Figure 3:
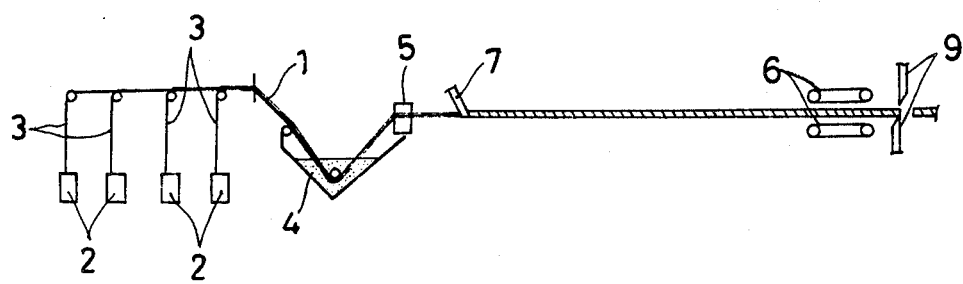
FIG. 3 is a diagram showing a modified example of the process according to the present invention.

In a case where a cold setting resin is used as the hardenable material 4, the heating chamber 8 is not necessary, and, as shown in FIG. 3, the drawn fiber body 1 is cut by the cutter 9 to a predetermined length, without being heated, and thereafter a large number of cut fiber bodies are allowed to stand until hardened completely at a room temperature to produce structural reinforcing articles.

The tape 7 may be constructed of paper, metal, or resin. The tape 7 is preferably coated with a releasing agent 10 such as silicone resin or the like so that the same may be easily removed after the hardening treatment of the drawn fiber body 1.

In the case of using a foaming thermosetting resin as the hardenable material 4, it is desirable to use a porous or gas permeable tape 7.

Figure 4:
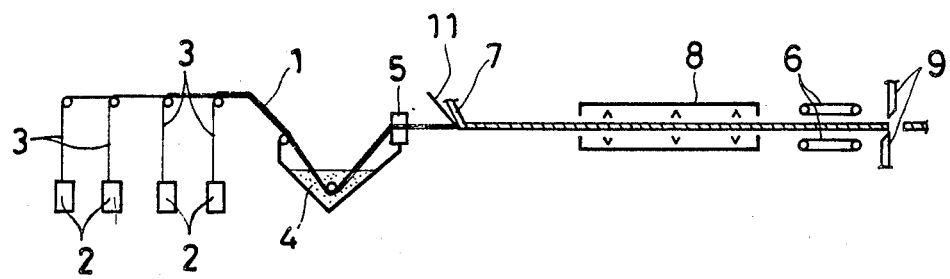
FIG. 4 is a diagram showing another embodying example of a process for manufacturing a deformed structural reinforcing material according to the present invention.
Figure 5:
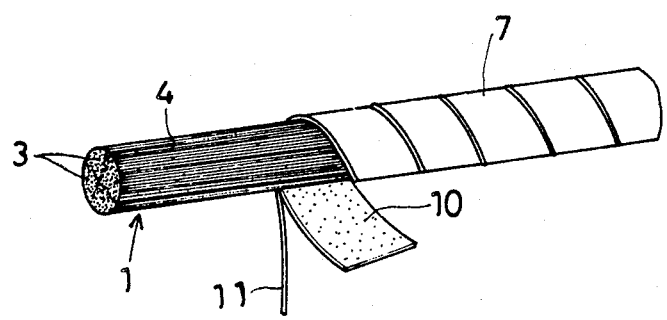
FIG. 5 is an enlarged perspective view of a step similar to FIG. 2, in the embodying example shown in FIG. 4.
Figure 6:
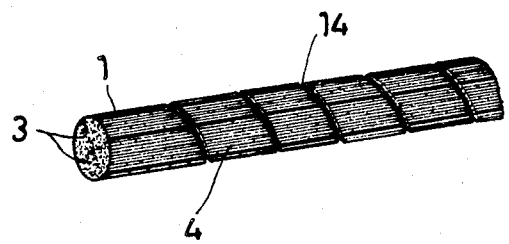
FIG. 6 is an enlarged perspective view of part of a structural reinforcing material produced by the embodying example shown in FIG. 4.

Another embodying example of the present invention provides a structural reinforcing material having a deformed sectional shape as shown in FIGS. 4 to 6 will be explained as follows.

The tape 7 is coiled, by a wrapping apparatus (not shown), around the fiber body 1 impregnated with a thermosetting resin 4 and drawn from the die 5 in a similar manner as in the foregoing embodying example. Thereafter, a string member 11 is coiled, at predetermined space intervals, around the coiled tape 7 which covers the fiber body 1. The string member 11 projects into the periphery of the fiber body 1 and in this condition the fiber body 1 is transported through the heating chamber 8 and is subjected to a complete hardening or curing treatment within the chamber 8. The complete rigid fiber body 1 taken out from the chamber 8 is cut by the cutter 9 into pieces of a desired length. The resultant cut tape 7 is removed along with the cut string member 11 from each of the resultant cut fiber bodies 1 to obtain a large number of deformed structural reinforcing articles each having a coiled groove 14 in the periphery of the rigid fiber body 1 as shown in FIG. 6.

In the foregoing examples, the tape 7 is coiled around the fiber body 1 continuously drawn from the die 5. The tape 7 and, if necessary, the string member 11, may be positioned around the fiber body of a predetermined length prepared by cutting the fiber body 1. Further, the tape 7 or the cut tape removed from the fiber body can be used again.

The string member 11 may be made of paper, metal or synthetic resin. A sectional shape thereof, a coiled pitch or a manner of coiling therearound may be changed as desired, so that various deformed structural reinforcing materials can be easily produced.

Another embodying example of the present invention in which structural reinforcing materials having various deformed sectional shapes which are different from that shown in FIG. 6, will be explained with reference to FIGS. 7–11 as follows.

The fiber body 1 impregnated with a coil setting resin is introduced into the die 5 having a desired sectional shape, for instance, a circular one, and is drawn into a predetermined sectional shaped article. The fiber body 1 is then cut by the cutter 9 into pieces of a predetermined length to obtain a large number of fiber bodies 1, as shown in FIG. 7. Next, a pair of shaping members 12 coated with a releasing agent each comprising a rod of which a sectional shape is a circle are disposed on the right and left side of the fiber body 1 along the entire length of the fiber body 1. As shown in FIG. 8, and thereafter, the tape 7 is coiled around the fiber body 1 so as to fasten the shaping member 12, 12 to the fiber body 1 and thrust them into the fiber body so that the circular sectional shape of the fiber body 1 may be deformed. In the deformed condition the fiber body 1 is allowed to stand at room temperature until it is completely hardened, as shown in FIG. 9.

Thereafter, the tape 7 is uncoiled and the two shaping members 12, 12 are removed from the fiber body 1. Thus, there is obtained a deformed structural reinforcing member of the present invention as shown in FIG. 10.

In the forgoing example, the deformed sectional shape of the fiber body 1 is provided by fastening the shaping members 12 to the fiber body with the tape 7 so as to thrust them into the fiber body 1. In the alternative, the deformed sectional shape may be given by pushing the members 12 into the drawn fiber body 1 by means of any pressing apparatus before the tape 7 is coiled therearound. Thus, in this case, the tape 7 serves to keep the members 12 in their thrust condition.

The shaping member 12 may be made of metal, ceramic, inorganic or organic material or a combination thereof. Also a shape of the shaping member 12 in the longitudinal direction may be formed into any other desired shape other than the straight one used in the above example. For instance, the longitudinal shape thereof may be formed into a curved shape such as a waveform shape. A deformed structural reinforcing material having a waveform groove 14 extending in the longitudinal direction thereof may be produced as shown in FIG. 11.

The shaping member 12 is not limited to a bar type, but may be modified into a spherical type, a star shape type, or any other desired shape. A large number of shaping members may be set distributively on the periphery of the fiber body 1 over the entire length thereof.

Further, the shaping member 12 may be made of a pliable long member and in this case the pliable shaping member is coiled around the fiber body 1 so as to deform the fiber body 1.

In the foregoing example, after the drawn fiber body 1 is cut into a predetermined length, a deformed sectional shape is given thereto by the shaping member 12. However, before cutting the drawn fiber body 1, a deformed sectional shape may be given thereto by the shaping member 12. Thereafter, the drawn fiber body 1 with the shaping member 12 set therein is cut to a predetermined length.

Another embodying example of this invention in which various deformed structural reinforcing materials of this invention differ from those in the foregoing examples will be explained with reference to FIGS. 12-17. In the first place, the fiber body 1 is impregnated with a thermosetting resin and drawn from the die 5 and the tape 7 is coiled around the drawn fiber body 1 and the drawn fiber body 1 covered with the coiled tape 7 is heated by the heating chamber 8 in almost the same manner as the embodying example explained with reference to FIG. 1.

Figure 12:
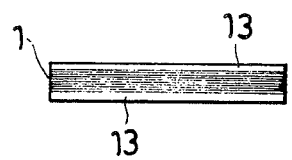
FIG. 12 and FIG. 13 are another embodying example according to the process of the present invention.
Figure 13:
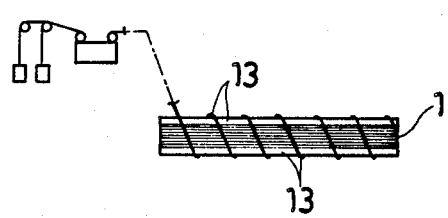
Figure 14:
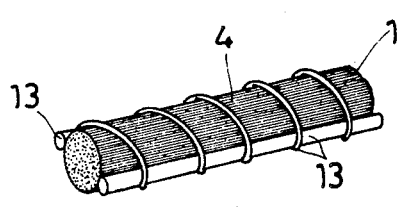
FIG. 14 is a perspective view of part of a structural reinforcing material produced in this example.

According to this embodying example, the fiber body 1 is not completely hardened by the heating chamber 8 in order that the fiber body 1 taken out from the heating chamber 8 may be formed into a semi-hardened body. The semi-rigid fiber body 1 is cut into pieces of a predetermined length to obtain a large number of fiber bodies. A resultant cut tape 7 is removed from each fiber body of a predetermined length. Next, a pair of projection forming members 13, 13, each being a bar having a circular sectional shape, for instance, are attached to the left and right side surfaces of the periphery of the fiber body 1 and over the full length thereof as shown in FIG. 12. Thereafter, another projection member 13 in the form a string member impregnated with the hardenable material 4 is coiled around the fiber body 1 assembled with the projection forming member 13, 13 as shown in FIG. 13. The assembled fiber body 1 is heated by a heating chamber (not shown) so that the drawn fiber body 1 may be hardened completely. Accordingly, there is obtained such a deformed structural reinforcing member that the rigid fiber body of a circular sectional shape is provided with the two bar type projection forming members 13, 13 and the string type projection forming member 13 being fixed thereto as shown in FIG. 14.

In the embodying example, the bar type projection forming member 13 is attached simply to the semihardened fiber body 1. The connecting force between the fiber body and the projection forming member 13 may be heightened by pressing the member 13, more or less, into the surface of the fiber body 1.

Figure 15:
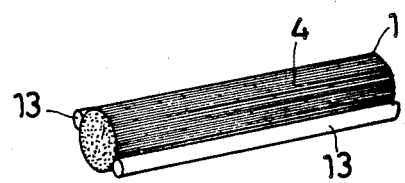
FIGS. 15 to 17 are various structural reinforcing members produced in respective modified examples.

As for the string type projection forming member 13, a string member not impregnated with the hardenable resin may be used. In this case, the coiled projection forming member 13 is removed after the fiber body 1 subjected to a complete hardening treatment. Consequently, a product shown in FIG. 15 is obtained. In this case, the connecting strength between the fiber body 1 and the bar type projection forming member 13 can be increased by applying an adhesive therebetween.

The material of the string type projection forming member 13 may be the same as that of the reinforcing thread 2, and may comprise yarn such as roving, etc., a prepregnated tape, or a monofilament.

In the case where the projection forming member 13 constitutes part of the deformed structural reinforcing material, a size of the diameter thereof, a sectional shape thereof, a pitch of the coil, or a manner of coiling around the fiber body may be varied as desired so that various deformed shapes of the products can be produced.

The projection forming member 13 may be made of metallic, ceramic, inorganic or resin material or a composite thereof. The size of the diameter, the shape or the manner of coiling around the fiber body may be changed as desired.

Figure 16:
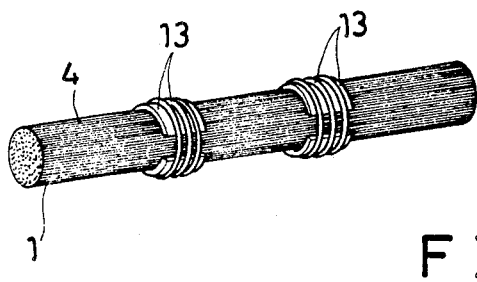

FIG. 16 shows another deformed structural reinforcing member in which plural short projection forming members 13 in the form of an arc embracing the circumference of the fiber body 1 are disposed at a predetermined space therebetween in the longitudinal direction thereof.

Figure 17:
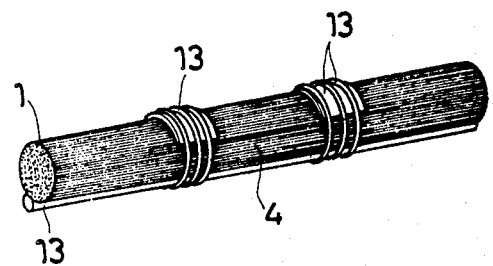

FIG. 17 shows further another deformed structural reinforcing material in which the combination of the projection forming member 13 in the form of a bar extending in the longitudinal direction of the fiber body 1 and the foregoing plural short projection forcing members 13 in the form of an arc are used.

In the foregoing example, the projection forming member 13 is attached to the cut fiber body 1, but may be attached to the drawn fiber body continuously draw from the die 5 before the drawn fiber body is cut.

Next, more detailed embodying examples will be explained as follows.

EXAMPLE 1

A fiber body formed by collecting thirty six strands into a parallel arrangement wherein each strand was made of total aromatic polyamide filament of 1400 denier under trade name "Kevlar 49 #965" and dipped in a thermosetting resin which comprises 100 parts of bisphenol A type epoxy resin, 33 parts of diaminobiphenyl sulfone, 1 part of boron trifluoromonoethylamine and 100 parts of methyletherketone. The fiber body was impregnated with the thermosetting resin to result in the mixing ratio of the resin 80 to the fiber body 100. Here, "parts" means "parts by weight". Thereafter, the fiber body was introduced into a die which was circular in its sectional shape. Thereby, a drawn fiber body having a circular sectional shape of about 3 mm in diameter was obtained.

Thereafter, a PET made tape of 7 mm in width and 50μ in thickness was coiled around the fiber body so as to cover the fiber body. This composition was passed through a heating chamber at 130° C. for 2 minutes so that the fiber body may be subjected to a hardening treatment. The resultant semi-rigid fiber body taken out from the chamber was cut into pieces of 30 m in length and the cut fiber bodies were introduced into a heating chamber and were heated at 130° C. for 10 minutes and thereafter, at 170° C. for 2 hours. The fiber bodies were taken out therefrom, and the tape was removed from each of the fiber bodies. Each fiber body was cut into pieces of 1.5 m in length. Thus, a large number of structural reinforcing members were produced.

EXAMPLE 2

The fiber body obtained in almost the same manner as the Example 1 was impregnated with a cold setting resin which comprises 100 parts of bisphenol type epoxy resin, and 10 parts of aliphatic amine to result in the mixing ratio of the resin 80 to the fiber body 100.

The fiber body was introduced into a die of a circular sectional shape, and was drawn therefrom to be formed into a drawn fiber body of a circular sectional shape of about 3 mm in diameter.

A polypropylene made tape of 7 mm wide and 70μ thick was coiled around the drawn fiber body so as to cover the fiber body and was cut into pieces of 1.5 m long in sequence. A large number of fiber bodies of a predetermined length were allowed to stand for 4 days until they were completely hardened. Thereafter, the cut tape was removed from each fiber body. Thus, a large number of structural reinforcing members were produced.

EXAMPLE 3

A string member comprising a PET made monofilament of 3000 denier was coiled, at a coiled pitch of 7 mm, around the drawn fiber body covered with the coiled tape in the same manner as the Example 1, so as to eat into the fiber body. Thereafter, the fiber body bearing the coiled tape and the coiled string member was treated in the same manner as the Example 1. As a result, there were produced a large number of deformed structural reinforcing materials each having a coiled groove formed therearound.

EXAMPLE 4

The fiber body formed in almost the same manner as the Example 1 was soaked in cold setting resin which comprises 100 parts of bisphonel A epoxy resin and 80 parts of modified heterocycle amine so that the fiber body may be impregnated with the cold setting resin in the ratio of the resin 100 to the fiber body 100. The resin impregnated fiber body was introduced into a die to be formed into a drawn fiber body of about 3 mm in diameter, and the fiber body was cut by a cutter into pieces 8 m long, for instance. A pair of steel wire members each coated with baked fluorocarbon resin and having 0.5 mm in diameter and 8 m in length were disposed on the opposite side surfaces of the drawn fiber body and along the longitudinal direction of the fiber body. A PET made tape 7 mm wide and 50μ thick was coiled around the fiber body assembled with the two opposite wire members. The fiber body was allowed to stand at room temperature for 24 hours and the tape was removed therefrom and thus a large number of deformed structural reinforcing materials were obtained.

EXAMPLE 5

The fiber body impregnated with the thermosetting resin, drawn from the die and wrapped with the coiled tape in almost the same manner as the Example 1 was introduced into a heating chamber at 130° C. for 2 minutes, so that the drawn fiber body in its semihardened condition was obtained.

Next, the drawn fiber body was cut by a cutter into pieces 8 m long, and thereafter the tape was removed from each of the fiber bodies of predetermined length.

Thereafter, a pair of wire members each of 0.5 mm in diameter were disposed on the opposite side surfaces of each of the fiber bodies and along the longitudinal length thereof. A strand of 1,420 denier and made of total aromatic polyamide and impregnated with the thermosetting resin was coiled around each of the fiber bodies assembled with the wire members. Each fiber body assembled with the wire members and the coiled strand was moved into a heating chamber and was heated at 130° C. for 10 minutes and thereafter at 170° C. for 2 hours. In this manner, deformed structural reinforcing members comprising a complete hardened fiber body fixedly assembled with the two wire members and the hardened coiled strand was obtained.

According to a first feature of this invention, after the fiber body comprising plural threads made of reinforcing fiber and impregnated with hardenable material is introduced into a die of a predetermined sectional shape to be formed into a drawn article of the predetermined sectional shape, a tape is coiled around the drawn fiber body so as to cover the article. Thus, the need of providing a separate and distinct type of metallic molds of which the sectional shapes corresponds to respective different sectional shapes of the drawn fiber bodies as required in the conventional process is eliminated. Consequently, manufacturing work and costs can be decreased. Further, according to a second feature of this invention, by coiling a string member around the coiled tape covering the drawn fiber body, or by coiling the tape around the drawn fiber body through a shaping member attached to the drawn fiber body, there can easily be produced a type of deformed structural reinforcing member wherein the rigid fiber body is provided with respective corresponding grooves. Further, according to a third feature of this invention, after the drawn fiber body coiled in a tape is semi-hardened, a projection forming member is attached to the semi-rigid fiber body and the complete hardening treatment is effected thereon. Thus, a type of deformed structural reinforcing member is easily produced wherein the projection forming member is fixed to the rigid fiber body.

Thus, by varying the string members, the shaping members or the projection forming members in shape, number, the way of coiling or disposition, various types of deformed reinforcing materials can be manufactured freely.

Further, according to this invention, there can be provided deformed reinforcing materials provided with various types of grooves made therein and those integrally assembled with the projection forming members which are stronger in mechanical strength than those comprising rigid fiber bodies alone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for manufacturing structural reinforcing material comprising the following steps:
   forming a fiber body from a plurality of threads made of reinforcing fiber;
   impregnating said fiber body with a hardenable material;
   drawing said impregnated fiber body through a drawing die having a desired sectional shape for forming said fiber body into a drawn article having a predetermined sectional shape;
   coiling a releasable tape around the drawn article for covering the outer surface thereof;
   coiling a string member around the whole circumferential surface of the drawn fiber article covered with the coiled tape so that the string member may thrust, through the coiled tape, into the surface of drawn fiber article;

subjecting the drawn fiber article to a hardening treatment; and removing the coiled tape and the coiled string member from the hardened drawn fiber article.

2. A process according to claim 1, wherein the hardenable material is a heat setting material.

3. A process according to claim 1, wherein the hardenable material is a cold-setting material.

4. A process according to claim 1, wherein the fiber body comprises a collection of a number of parallel fibers with twist.

5. A process according to claim 1, wherein the thread is made of a monofilament, multifilaments, a strand, a sliver or a roving.

* * * * *